(12) United States Patent
Badhe et al.

(10) Patent No.: US 9,189,543 B2
(45) Date of Patent: Nov. 17, 2015

(54) PREDICTING SERVICE REQUEST BREACHES

(75) Inventors: Yogesh P. Badhe, Pune (IN); Steven G. Barbee, Amenia, NY (US); George E. Stark, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 13/298,673

(22) Filed: Nov. 17, 2011

(65) Prior Publication Data

US 2013/0132060 A1 May 23, 2013

(51) Int. Cl.
*G06F 17/30* (2006.01)
*G06Q 10/06* (2012.01)

(52) U.S. Cl.
CPC ........ *G06F 17/3071* (2013.01); *G06Q 10/0631* (2013.01); *G06F 17/3061* (2013.01); *G06Q 10/0633* (2013.01); *G06Q 10/06313* (2013.01)

(58) Field of Classification Search
None
See application file for complete search history.

(56) References Cited

U.S. PATENT DOCUMENTS

| | | | |
|---|---|---|---|
| 2002/0169783 A1* | 11/2002 | Kreulen et al. | 707/102 |
| 2005/0234973 A1* | 10/2005 | Zeng et al. | 707/103 R |
| 2006/0149837 A1* | 7/2006 | Weiner et al. | 709/224 |
| 2007/0005343 A1* | 1/2007 | Sandor et al. | 704/9 |
| 2007/0083650 A1* | 4/2007 | Collomb et al. | 709/224 |
| 2008/0195404 A1* | 8/2008 | Chron et al. | 705/1 |
| 2009/0292677 A1* | 11/2009 | Kim | 707/3 |
| 2009/0299786 A1* | 12/2009 | Kunjur et al. | 705/7 |
| 2010/0094677 A1* | 4/2010 | Peltz et al. | 705/8 |
| 2010/0211957 A1* | 8/2010 | Lotlikar et al. | 718/104 |

OTHER PUBLICATIONS

G. Forman et al, "Pragmatic Text Mining: Minimizing Human Effort to Quantify Many Issues in Call Logs", International Conference on Knowledge Discovery and Data Mining (KDD'06), Aug. 20-23, 2006, ACM, 10 pages.*

T.M. Edgington et al, "Using process mining to identify coordination patterns in IT service management", Decision Support Systems; Feb. 20, 2010; pp. 175-186.*

H.C. Lau et al, "Development of a process mining system for supporting knowledge discovery in a supply chain network", Int. J. Production Economics, vol. 122 (2009), Elsvier B.V., pp. 176-187.*

(Continued)

*Primary Examiner* — Kamini S Shah
*Assistant Examiner* — David M Rogers
(74) *Attorney, Agent, or Firm* — Schmeiser, Olsen & Watts; Mark Vallone (57) ABSTRACT

An approach for prioritizing work requests to resolve incidents in an information technology (IT) infrastructure is presented. Historical data of work requests to resolve incidents in the IT infrastructure is divided into first and second data sets. A first set of data fields of work requests in the first data set is used to generate incident concept(s). The incident concept(s) are combined with a second set of data fields of the work requests in the first data set to form a set of predictive variables. Utilizing the predictive variables, a statistical model is generated for predicting whether or not work requests will be resolved in accordance with a service level target. The statistical model is validated using the second data set. The statistical model is deployed to the IT infrastructure.

18 Claims, 5 Drawing Sheets

(56) References Cited

OTHER PUBLICATIONS

Business analytics for insurance, IBM Software Group, IBM Corporation 2010, 9 pages.

Bartolini et al., IT Service Incidents Prioritization driven by Business Objectives, Proceedings of the 12th Annual Workshop of HP OpenView University Association, Jul. 10-13, 2005, 14 pages.

* cited by examiner

PREDICTING SERVICE REQUEST BREACHES

TECHNICAL FIELD

The present invention relates to a data processing method and system for managing service level agreements, and more particularly to prioritizing work requests to resolve incidents in accordance with service level agreements.

BACKGROUND

Information technology (TT) infrastructure incidents are resolved by processing work requests that request work to be performed to fix a component of the IT infrastructure that is not functioning properly. Work requests can be automatically generated from a software monitoring application or manually generated by an end user. In either case, a work request is classified and prioritized against other outstanding work requests. IT service teams are assigned to meet service level targets. Service level targets are, for example, of the form "severity one incidents must be resolved in less than four hours" or "severity three incidents must be resolved in less than seven business days." Work requests are usually classified by the severity of the incidents to be resolved by the work requests. The severity of incidents is based on the number of users affected or the amount of potential business loss. Known systems prioritize work requests, including similarly classified work requests, on a first in-first out basis.

BRIEF SUMMARY

In first embodiments, the present invention provides a method of prioritizing work requests to resolve incidents in an information technology (IT) infrastructure. The method includes a computer dividing, into first and second data sets, historical data of work requests to resolve incidents in the IT infrastructure. Each of the work requests comprises data fields. The method further includes, using a first set of data fields of the work requests in the first data set, the computer generating one or more incident concepts. The method further includes the computer combining the one or more incident concepts with a second set of data fields of the work requests in the first data set to form a set of predictive variables. The method further includes the computer generating a statistical model utilizing the predictive variables. The statistical model predicts whether or not work requests will be resolved in accordance with a service level target. The method further includes the computer validating the statistical model using the second data set. The method further includes the computer deploying the validated statistical model to the IT infrastructure.

In second embodiments, the present invention provides a computer system including a central processing unit (CPU), a memory coupled to the CPU, and a computer-readable, tangible storage device coupled to the CPU. The storage device contains instructions that, when carried out by the CPU via the memory, implement a method of prioritizing work requests to resolve incidents in an information technology (IT) infrastructure. The method includes the computer system dividing, into first and second data sets, historical data of work requests to resolve incidents in the IT infrastructure. Each of the work requests comprises data fields. The method further includes, using a first set of data fields of the work requests in the first data set, the computer system generating one or more incident concepts. The method further includes the computer system combining the one or more incident concepts with a second set of data fields of the work requests in the first data set to form a set of predictive variables. The method further includes the computer system generating a statistical model utilizing the predictive variables. The statistical model predicts whether or not work requests will be resolved in accordance with a service level target. The method further includes the computer system validating the statistical model using the second data set. The method further includes the computer system deploying the validated statistical model to the IT infrastructure.

In third embodiments, the present invention provides a computer program product including a computer-readable, tangible storage device having computer-readable program instructions stored therein, the computer-readable program instructions, when carried out by a central processing unit (CPU) of a computer system, implement a method of prioritizing work requests to resolve incidents in an information technology (IT) infrastructure. The method includes the computer system dividing, into first and second data sets, historical data of work requests to resolve incidents in the IT infrastructure. Each of the work requests comprises data fields. The method further includes, using a first set of data fields of the work requests in the first data set, the computer system generating one or more incident concepts. The method further includes the computer system combining the one or more incident concepts with a second set of data fields of the work requests in the first data set to form a set of predictive variables. The method further includes the computer system generating a statistical model utilizing the predictive variables. The statistical model is predicts whether or not work requests will be resolved in accordance with a service level target. The method further includes the computer system validating the statistical model using the second data set. The method further includes the computer system deploying the validated statistical model to the IT infrastructure.

In fourth embodiments, the present invention provides a process for supporting computing infrastructure. The process includes a first computer system providing at least one support service for at least one of creating, integrating, hosting, maintaining, and deploying computer-readable code in a second computer system comprising a processor. The computer-readable code contains instructions. The instructions, when carried out by a processor of the second computer system, implement a method of prioritizing work requests to resolve incidents in an information technology (IT) infrastructure. The method includes the second computer system dividing, into first and second data sets, historical data of work requests to resolve incidents in the IT infrastructure. Each of the work requests comprises data fields. The method further includes, using a first set of data fields of the work requests in the first data set, the second computer system generating one or more incident concepts. The method further includes the second computer system combining the one or more incident concepts with a second set of data fields of the work requests in the first data set to form a set of predictive variables. The method further includes the second computer system generating a statistical model utilizing the predictive variables. The statistical model predicts whether or not work requests will be resolved in accordance with a service level target. The method further includes the second computer system validating the statistical model using the second data set. The method further includes the second computer system deploying the validated statistical model to the IT infrastructure.

Embodiments of the present invention combine text mining with statistical modeling to predict the likelihood of an incident missing criteria and to alert a dispatcher to take corrective action as needed. The approach disclosed herein is dynamic so that the predictive statistical model may be updated as the workload changes over time. Further, embodiments of the present invention reduce the risk of missing contractual service levels, which saves money in penalty payments. Still further, embodiments presented herein allow for differences among customers in terms of terminology, environment and risk.

DETAILED DESCRIPTION

Overview

Embodiments of the present invention recognize that using either (1) a first in-first out system or (2) a ticket severity system for prioritizing work requests (a.k.a. service requests) to resolve incidents in an IT infrastructure does not minimize the chance of missing a service level target. Embodiments of the present invention utilize text mining of content of historical incidents and a dynamic statistical model created from historical records to predict whether or not incidents in the IT infrastructure will be resolved in accordance with the service level target (i.e., for each incident, determine a likelihood that the incident will be resolved in accordance with the service level target). The incidents forecasted as "out of criteria" may be presented to an end user (e.g., a dispatcher) in a notification. An incident forecasted as "out of criteria" is an incident predicted to be resolved in a manner that is not in accordance with the service level target (i.e., a service request breach is predicted for the service request that specifies the incident). For example, an incident forecasted as out of criteria is an incident resolved in a time period that exceeds a contractually obligated time period for resolving the incident. Based on the aforementioned notification, the end user may prioritize the incidents forecasted as out of criteria with a higher priority relative to other incidents forecasted as "within criteria" (i.e., predicted to be resolved in accordance with the service level target). Furthermore, the end user may take pre-emptive action to resolve the prioritized incidents forecasted as out of criteria so that the incidents are more likely to be resolved within criteria. For example, the dispatcher may assign a prioritized incident to a more skilled resource, interrupt a current work request so that a resource with the appropriate skills may be re-assigned to the prioritized incident, or assign a team to resolve the prioritized incident.

As data is added to the historical records, the number of incident concepts increases and the discrimination among incident concepts becomes more distinctive, thereby improving the accuracy and predictive capability of the dynamic statistical model.

In one embodiment, a dynamic statistical model is provided for forecasting the duration of individual incident tickets for a pool of accounts. The forecasting disclosed herein may result in higher quality service delivery by decreasing the number of incident tickets being resolved out of criteria. Further, the forecasting disclosed herein may allow future service level agreements to include service level targets that are "tighter" (i.e., modified to be more attractive to prospective customers). Still further, embodiments of the present invention may provide rule analysis that identifies the logic that is most often used to identify high risk incident tickets and determines whether preventative action can be taken to reduce the number of incoming incident tickets.

Figure 1:
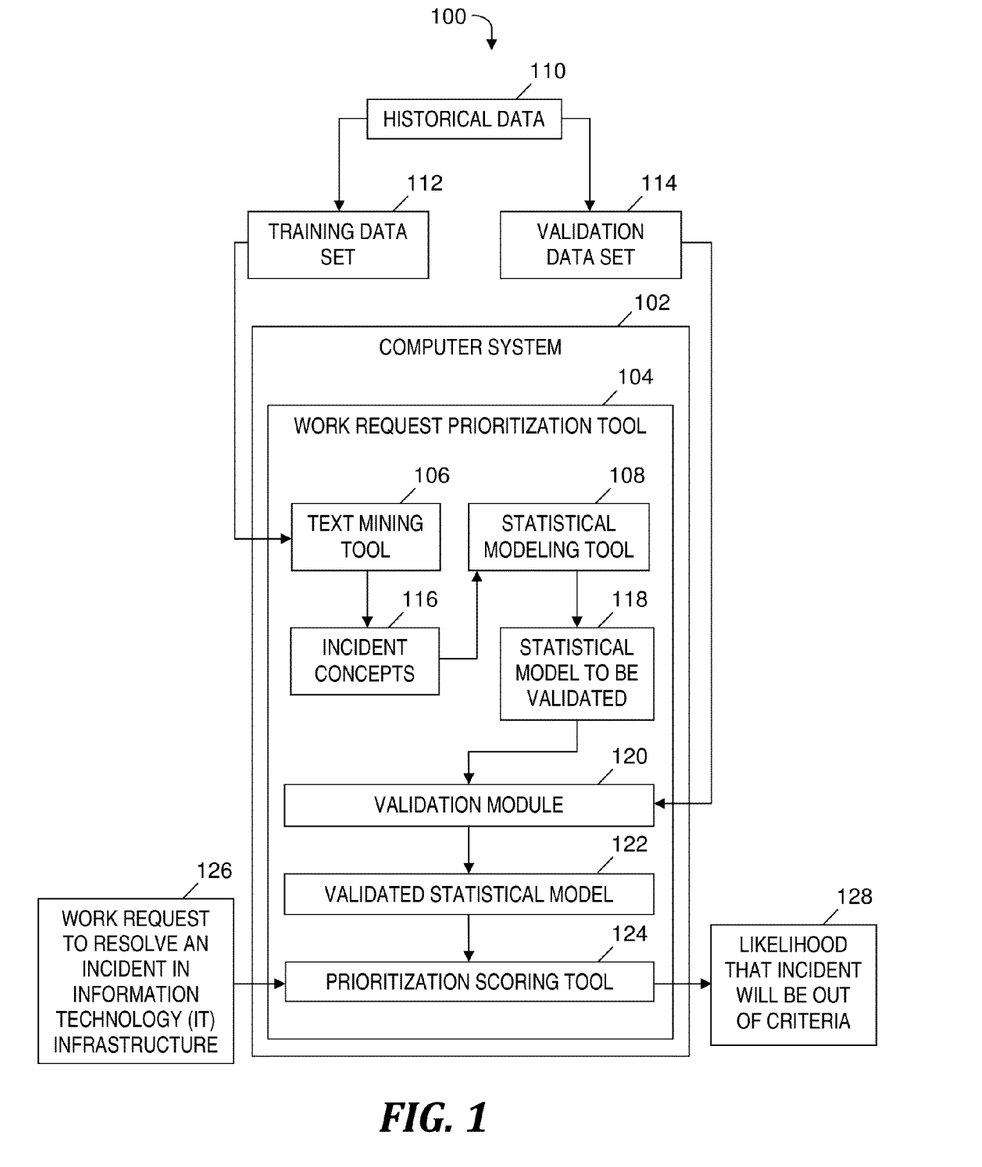
FIG. 1 is a block diagram of a system for prioritizing work requests to resolve incidents in an IT infrastructure, in accordance with embodiments of the present invention.

System For Prioritizing Work Requests to Resolve Incidents in an IT Infrastructure FIG. 1 is a block diagram of a system for prioritizing work requests to resolve incidents in an IT infrastructure, in accordance with embodiments of the present invention. System 100 includes a computer system 102 that runs a software-based work request prioritization tool 104, which includes a software-based text mining tool 106 and a software-based statistical modeling tool 108. System 100 also includes historical data 110, which includes records of work requests that specify historical incidents in the IT infrastructure, where each historical incident was either resolved or not resolved in accordance with a respective service level target. Historical data 110 is stored in one or more data repositories (not shown). Each record included in historical data 110 includes a first set of one or more data fields that includes a description of a respective historical incident and may also include a work type of the respective historical incident. As used herein, a work type is defined as an indicator of a set of skills required by a person to resolve an incident in an IT infrastructure.

Each record included in historical data 110 also includes a second set of one or more data fields that may include one or more of: an identifier of a customer, an identifier of a classification (a.k.a. classification ID), an arrival date and time, identifier of a severity, a complexity, and a target completion date and time. The identifier of a customer identifies a customer from which a work request that specifies an incident originates. The classification ID identifies a standard category of an incident in an IT infrastructure. For example, if a UNIX environment is being managed, there are standard classification IDs that categorize incidents of the UNIX environment as relating to storage, application, etc. The arrival date is the date on which the work request was received for processing. The arrival time is the time at which the work request was received for processing. The identifier of a severity identifies a level of severity of the incident resolved by the work request. The complexity identifies a complexity of the incident. The target completion date is the date on which the incident was expected to be resolved. The target completion time is the time at which the incident was expected to be resolved.

A partitioning module (not shown) may divide historical data 110 into mutually exclusive first and second data sets: a training data set 112 and a validation (i.e., testing) data set 114, which are stored in one or more data repositories (not shown). The partitioning module may run in computer system 102 or in another computer system (not shown). As one example, historical data 110 is partitioned so that 80% of its records are in training data set 112 and 20% of its records are in validation data set 114.

Text mining tool 106 performs text mining of training data set 112 to find keywords (i.e., performs text mining of the first set of one or more data fields in records included in training data set 112). The text mining includes mining the description of the incidents in training data set 112, and may also include mining the work type of the incidents in training data set 112. Text mining tool 106 creates incident concepts 116 from the keywords found as a result of text mining the training data set 112. As used herein, an incident concept is defined as a set of one or more keywords that are derived from the content of incidents provided by a particular customer. In one embodiment, each keyword included in the set of one or more keywords occurs in descriptions of historical incidents at a frequency that exceeds a pre-defined threshold value. An incident concept allows a new, incoming incident in an IT infrastructure to be categorized as having or not having the incident concept.

Statistical modeling tool 108 uses incident concepts 116 and the second set of one or more data fields in records of training data set 112 to generate predictive variables, which are used to generate a statistical model 118 that is not yet validated.

Work request prioritization tool 104 includes a validation module 120, which uses records from validation data set 114 to validate statistical model 108, thereby generating validated model 122.

Work request prioritization tool 104 also includes a prioritization scoring tool 124, which receives validated statistical model 122 and a current work request 126, which is a work request to resolve an incident in the IT infrastructure. Using the validated statistical model 122, prioritization scoring tool 124 determines a likelihood 128 that the incident specified by work request 126 will be out of criteria (i.e., likelihood that the incident will not be resolved in accordance with a service level target specified in a service level agreement). In one embodiment, the prioritization scoring tool 124 scores the received work request 126 as specifying an incident likely to be resolved out of criteria (i.e., not resolved in accordance with a service level target) or likely to be resolved within criteria (i.e., resolved in accordance with a service level target).

Prioritization scoring tool 124 may receive other work requests (not shown) that specify other incidents in the IT infrastructure. Prioritization scoring tool 124 may determine likelihoods that the other incidents will be out of criteria.

In alternate embodiments, one or more of tools 106, 108, and 124 and module 120 may run in one or more other respective computer systems (not shown) that are operatively coupled to computer system 102.

The functionality of the components of system 100 is further described below relative to FIGS. 2A-2B and FIG. 4.

Figure 2A:
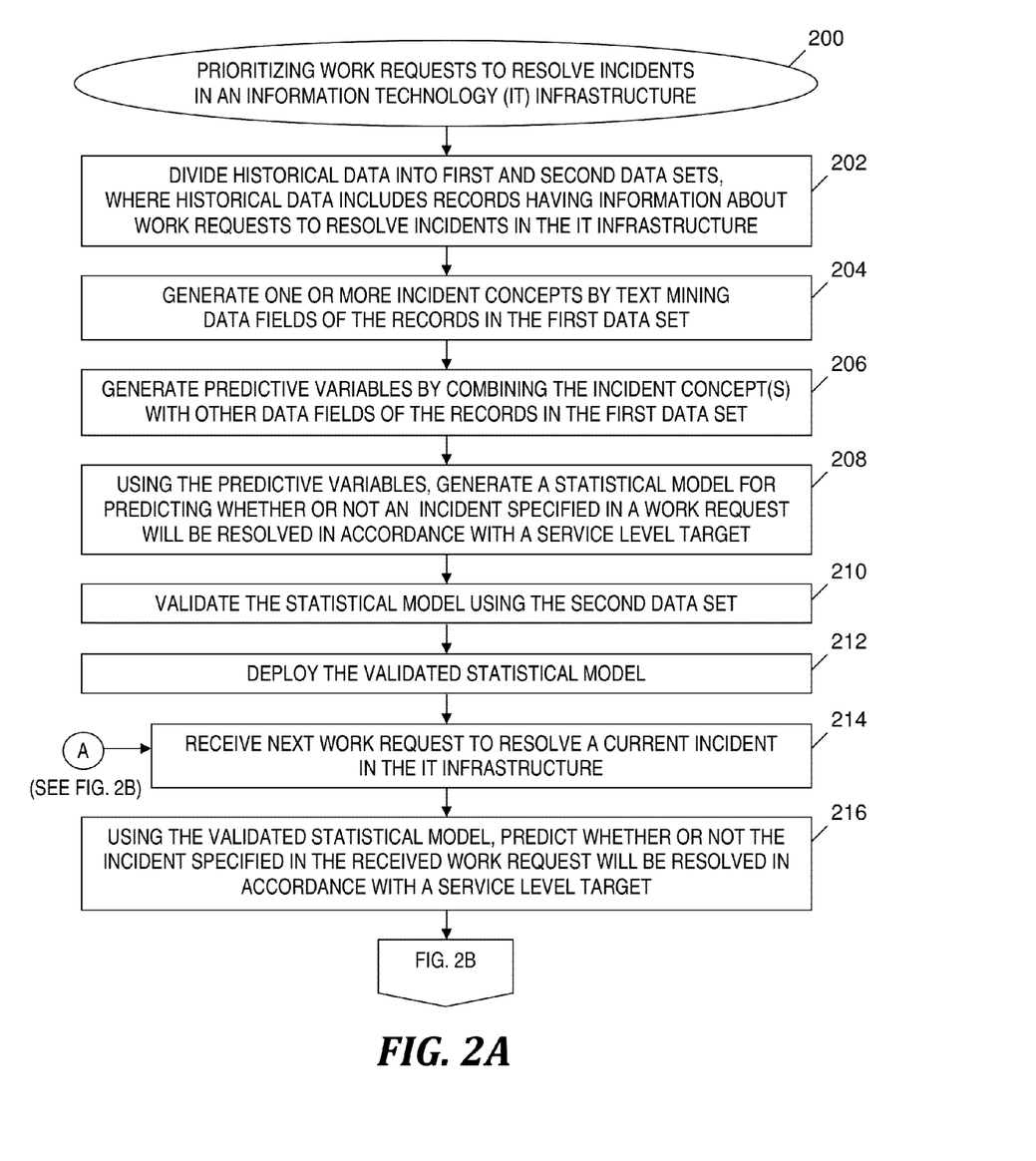
FIGS. 2A-2B depict a flowchart of a process of prioritizing work requests to resolve incidents in an IT infrastructure, where the process is implemented in the system of FIG. 1, in accordance with embodiments of the present invention.
Figure 2B:
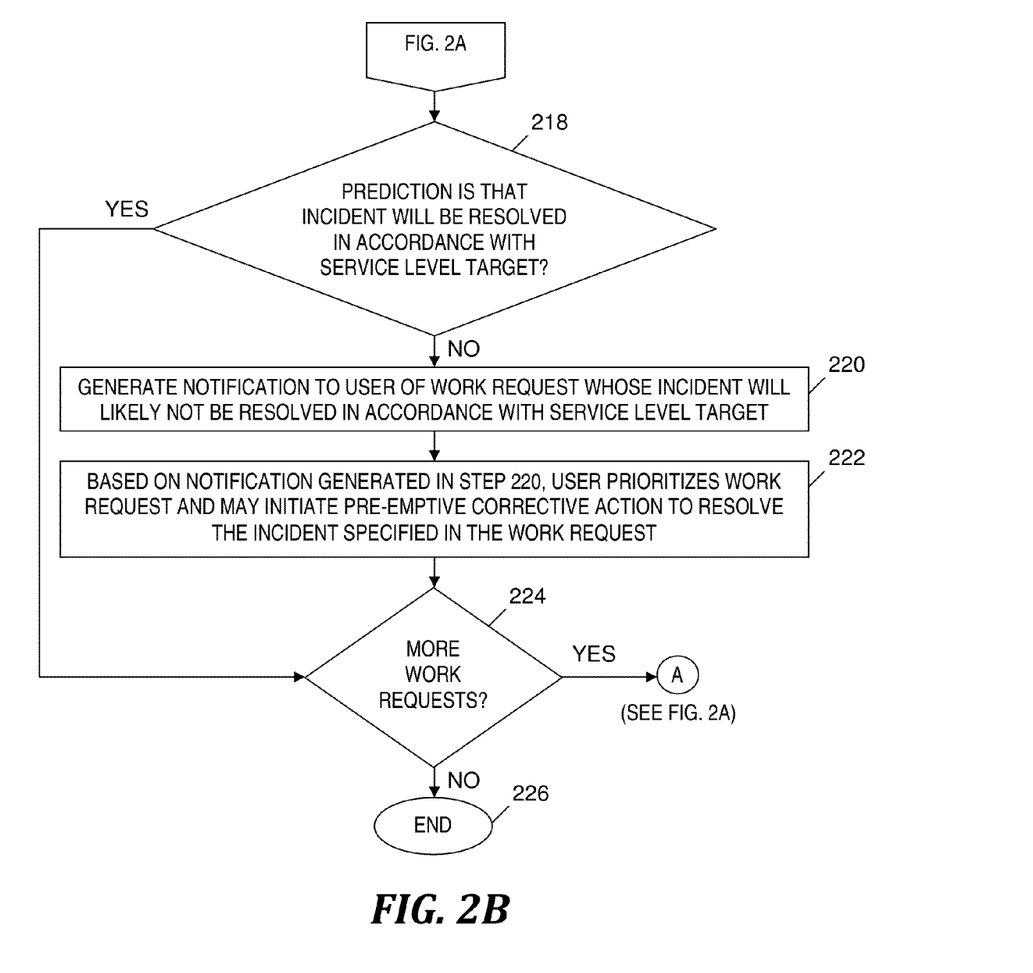

Process for Prioritizing Work Requests to Resolve Incidents in an IT Infrastructure FIGS. 2A-2B depict a flowchart of a process of prioritizing work requests to resolve incidents in an IT infrastructure, where the process is implemented in the system of FIG. 1, in accordance with embodiments of the present invention. The process of prioritizing work requests to resolve incidents in the IT infrastructure starts at step 200. In step 202, a partitioning module running in computer system 102 (see FIG. 1) divides the records in historical data 110 (see FIG. 1) into training data set 112 (see FIG. 1) and validation (i.e., testing) data set 114 (see FIG. 1). The records in historical data 110 (see FIG. 1) include known outcomes of historical work requests to resolve historical incidents in the IT infrastructure in accordance with service level targets. Training data set 112 (see FIG. 1) is for building a statistical model (see step 208 described below). Validation data set 114 (see FIG. 1) is for testing the statistical model against similar, but not identical data (see step 210 described below).

In step 204, text mining tool 106 (see FIG. 1) generates one or more incident concepts 116 (see FIG. 1) by text mining a first set of data fields included in the records of training data set 112 (see FIG. 1) (i.e., records that were partitioned into the training data set 112 (see FIG. 1) from historical data 110 (see FIG. 1) in step 202). The first set of data fields of each record includes a description of a respective incident of the IT infrastructure and may also include a work type, as described above in the discussion of FIG. 1.

In one embodiment, in step 204, text mining tool 106 generates multiple sets of incident concepts associated with multiple customers in a one-to-one correspondence. The sets of incident concepts are generated in step 204 based on the terminology used by the respective customers. Therefore, each set of incident concepts reflects a particular culture of the corresponding customer.

In step 206, statistical modeling tool 108 (see FIG. 1) generates predictive variables by combining the incident concept(s) generated in step 204 with a second set of data fields included in the records of training data set 112 (see FIG. 1). The second set of data fields may include one or more of: an identifier of a customer, a classification ID, an arrival date and time, identifier of a severity, a complexity, and a target completion date and time, which are described above in the discussion of FIG. 1.

In step 208, statistical modeling tool 108 (see FIG. 1) uses the predictive variables generated in step 206 to generate statistical model 118 (see FIG. 1) for predicting whether or not an incident specified by a work request will be resolved in accordance with a service level target. In one embodiment, the statistical model 118 (see FIG. 1) generated in step 208 is a set of rules providing prediction logic that uses the predictive variables generated in step 206 (a.k.a. predictors or predictor variables; i.e., independent variables) as input variables to generate a prediction of a dependent variable; i.e., a predicted value (a.k.a. target value) of an attribute that indicates whether or not an incident will be resolved out of criteria.

In one embodiment, the set of rules of the statistical model 118 (see FIG. 1) tests whether the keywords in a description of an incoming incident match an incident concept included in the statistical model 118 (see FIG. 1) and may further test whether the incoming incident is characterized by value(s) that match value(s) of data field(s) included in records of the historical data 110 (see FIG. 1). If the aforementioned matches are found, then the statistical model 118 (see FIG. 1) outputs a "true" value. For example, the statistical model 118 (see FIG. 1) generates a "true" value because all of the following conditions are true: the severity of an incoming incident matches a severity level of "1", the day of the arrival of the incoming incident matches a value of "Monday" and the description of the incoming incident matches an incident concept because the description includes the keyword "memory."

In one embodiment, the statistical model 118 (see FIG. 1) generated in step 208 includes logic that identifies different severity-related requirements of different customers. For example, statistical model 118 (see FIG. 1) may include logic that identifies Customer 1 as requiring incidents at the Severity 1 level be resolved within two hours, and that identifies Customer 2 as requiring incidents at the Severity 1 level be resolved within four hours.

In one embodiment, the statistical model 118 (see FIG. 1) generated in step 208 includes logic that is flexible enough to identify different environments (e.g., servers, storage, mainframes, databases, etc.) that are important to different customers.

In step 210, validation module 120 (see FIG. 1) validates the statistical model 118 (see FIG. 1) generated in step 208 by scoring data in the records included in the validation data set 114 (see FIG. 1). The validating performed in step 210 results in the validated statistical model 122 (see FIG. 1). Scoring the data in step 210 includes using the predictive variables in the validated statistical model 122 (see FIG. 1) to generate the predicted value of the attribute that indicates whether or not an incident will be resolved out of criteria. In one embodiment, the predictive variables used in the scoring process in step 210 must be the same fields that were used in the process of generating the statistical model 118 (see FIG. 1) in step 208. The validation module 120 (see FIG. 1) records the predicted values and compares the predicted values to actual values of the attribute included in records of validation data set 114 (see FIG. 1). The ratio of correct predictions (i.e., predicted values that match the actual values of the attribute in validation data set 114 (see FIG. 1)) to the total number of records of actual outcomes included in validation data set 114 (see FIG. 1) indicates the accuracy of statistical model 122 (see FIG. 1).

In step 212, computer system 102 (see FIG. 1) deploys the validated statistical model 122 (see FIG. 1).

In step 214, computer system 102 (see FIG. 1) receives a work request to resolve a current incident in the IT infrastructure.

In step 216, using the validated statistical model 122 (see FIG. 1), prioritization scoring tool 124 (see FIG. 1) predicts whether or not the incident specified by the work request received in step 214 (a.k.a. the incoming incident) will be resolved in accordance with a service level target. Step 216 includes computer system 102 (see FIG. 1) parsing a description of the incoming incident to determine if keywords in the description match an incident concept generated in step 204 (see FIG. 2A).

Based at least in part on the keywords in the description of the incoming incident matching an incident concept that is associated with historical incidents that had been resolved out of criteria, the prioritization scoring tool 124 (see FIG. 1) determines that the incoming incident is likely to be resolved out of criteria (i.e., determines that the incoming incident is high risk).

Determining that the incoming incident is high risk may also be based on value(s) characterizing the incoming incident matching value(s) indicated in rules of statistical model 122 (see FIG. 1), where the value(s) indicated in the rules are based on the data fields included in the historical data 110 (see FIG. 1). That is, determining that the incoming incident is high risk may be based on determining that value(s) characterizing the incoming incident respectively match an identifier of a customer, a classification ID, an arrival date, an arrival time, a severity, a complexity, a target completion date and/or a target completion time.

In one embodiment, based at least in part on the keywords in the description of the incoming incident matching an incident concept that is associated with historical incidents that had been resolved within criteria, the prioritization scoring tool 124 (see FIG. 1) determines that the incoming incident is likely to be resolved within criteria (i.e., determines that the incoming incident is low risk).

As one example, a software-based modeling tool such as SPSS MODELER generates the rules of statistical model 122 (see FIG. 1) and generates source code for the rules, where the source code is run in computer system 102 (see FIG. 1) to categorize an incoming incident ticket as being high risk or low risk. SPSS MODELER is a data mining software tool offered by INTERNATIONAL BUSINESS MACHINES CORPORATION located in Armonk, N.Y.

Following step 216, the process of FIGS. 2A-2B continues with inquiry step 218 in FIG. 2B.

If computer system 102 (see FIG. 1) determines in step 218 that the prediction generated in step 216 indicates that the incident specified in the received work request will not be resolved in accordance with the service level target, then the No branch of step 218 is taken and step 220 is performed.

In step 220, computer system 102 (see FIG. 1) generates a notification and presents the notification to a user. The generated notification indicates to the user that the incident specified by the work request received in step 214 (see FIG. 2A) will likely not be resolved in accordance with the service level target.

In step 222, based on the notification generated and presented in step 220, the user prioritizes the work request received in step 214 (see FIG. 2A) relative to other work requests received by computer system 102 (see FIG. 1). The user may also initiate a pre-emptive corrective action to resolve the incident within criteria, thereby preventing the incident from being actually resolved out of criteria and avoiding payment of a penalty specified in a service level agreement for the incident being resolved out of criteria. For example, the user may receive the notification generated in step 220 with sufficient time to assign a more skilled resource to resolve the incident indicated by the notification, interrupt a current work request being addressed by a resource who has the skills to resolve the incident and then re-assign the resource to resolve the incident, or assign a team to resolve the incident.

If computer system 102 (see FIG. 1) determines in step 224 that one or more work requests are to be received, then the Yes branch of step 224 is taken and the process of FIGS. 2A-2B loops back to step 214 in FIG. 2A with a next work request being received by computer system 102 (see FIG. 1). Otherwise, if no other work requests are to be received, then the No branch of step 224 is taken and the process of FIGS. 2A-2B ends at step 226.

Returning to step 218, if computer system 102 (see FIG. 1) determines that the prediction generated in step 216 indicates that the incident specified in the received work request will be resolved in accordance with the service level target, then the Yes branch of step 218 is taken and step 224 is performed, as described above.

In one embodiment, step 210 (see FIG. 2A) is an attempt to validate statistical model 118 (see FIG. 1) and before successfully validating statistical model 118 (see FIG. 1), the process of FIGS. 2A-2B loops back to steps 206, 208 and 210 in FIG. 2A to iteratively refine the statistical model 118 (see FIG. 1) until the validation process in step 210 (see FIG. 2A) successfully generates validated statistical model 122 (see FIG. 1). For example, if step 210 (see FIG. 2A) cannot validate the statistical model 118 (see FIG. 1), then the process of FIGS. 2A-2B loops back to step 206 (see FIG. 2A), which may include adding one or more predictive variables to and/or deleting one or more of predictive variables from the predictive variables generated in a previous performance of step 206 (see FIG. 2A).

As one example illustrated by Table 1 and Table 2, statistical model 118 (see FIG. 1) is based on the following key data elements: work order creation day (i.e., Sunday . . . Saturday), a duration between ticket creation date and target completion date, a priority, a work type, and incident concepts found in the descriptions of incidents (i.e., "logical disk," "disk space," "process," "memory," etc.).

Table 1 includes the results from applying statistical model 118 (see FIG. 1) to each record in training data set 112 (see FIG. 1), with the results including a total number of records in training data set 112 (see FIG. 1) that correspond to each of the combinations listed below, and percentages of predicted values relative to actual records in training data set 112 (see FIG. 1) corresponding to the combinations listed below.

1. For records in training data set 112 (see FIG. 1) in which there is no actual service level outcome (SLO) breach (i.e., Actual SLO Breach=N) and for which an SLO breach is not predicted by the statistical model 118 (see FIG. 1) (i.e., Predicted SLO Breach=N).
2. For records in training data set 112 (see FIG. 1) in which there is no actual SLO breach (i.e., Actual SLO Breach=N) and for which an SLO breach is predicted by the statistical model 118 (see FIG. 1) (i.e., Predicted SLO Breach=Y).
3. For records in training data set 112 (see FIG. 1) in which there is an actual SLO breach (i.e., Actual SLO Breach=Y) and for which an SLO breach is not predicted by the statistical model 118 (see FIG. 1) (i.e., Predicted SLO Breach=N).
4. For records in training data set 112 (see FIG. 1) in which there is an actual SLO breach (i.e., Actual SLO Breach=Y) and for which an SLO breach is predicted by the statistical model 118 (see FIG. 1) (i.e., Predicted SLO Breach=Y).

TABLE 1

|  | Predicted SLO Breach = N | Predicted SLO Breach = Y |
| --- | --- | --- |
| Actual SLO Breach = N | 3,834 (78.07%) | 1,077 (21.93%) |
| Actual SLO Breach = Y | 285 (8.01%) | 3,273 (91.99%) |

For example, the 3,273 result in Table 1 indicates that there are 3,273 records in training data set 112 (see FIG. 1) in which there is an indication of an actual SLO breach and for which an SLO breach is predicted by the statistical model 118 (see FIG. 1). Furthermore, the (91.99%) result in Table 1 states that the statistical model 118 (see FIG. 1) correctly predicts a breach of the SLO for 91.99% of the records in training data set 112 (see FIG. 1) that indicate an actual breach of the SLO. That is, there are 285+3,273 or 3,558 records that indicate an actual breach of the SLO (see the second row of data in Table 1 labeled Actual SLO Breach=Y), and 3,273/3,558=91.99%.

In one embodiment, statistical modeling tool 108 (see FIG. 1) generates a tentative statistical model in step 208 and calculates a percentage indicating the ratio of the number of records in the training data set 112 (see FIG. 1) for which a breach of the SLO is correctly predicted by statistical model 118 (see FIG. 1) to the number of records in the training data set 112 (see FIG. 1) that indicate an actual breach of the SLO (i.e., calculates a result analogous to the to the 91.99% percentage result in Table 1). If the aforementioned calculated percentage exceeds a pre-defined threshold (e.g., 80%), then the statistical modeling tool 108 (see FIG. 1) determines that the tentative statistical model is a final statistical model generated by step 208 (see FIG. 2A), which is then validated in step 210 (see FIG. 2A).

Table 2 includes the results from applying statistical model 118 (see FIG. 1) to each record in validation data set 114 (see FIG. 1), with the results including a total number of records in validation data set 114 (see FIG. 1) that correspond to each of the combinations listed below, and percentages of predicted values relative to actual records in validation data set 114 (see FIG. 1) corresponding to the combinations listed below:

1. For records in validation data set 114 (see FIG. 1) in which there was no actual service level outcome (SLO) breach (i.e., Actual SLO Breach=N) and for which an SLO breach is not predicted by the statistical model 118 (see FIG. 1) (i.e., Predicted SLO Breach=N).
2. For records in validation data set 114 (see FIG. 1) in which there was no actual SLO breach (i.e., Actual SLO Breach=N) and for which an SLO breach is predicted by the statistical model 118 (see FIG. 1) (i.e., Predicted SLO Breach=Y).
3. For records in validation data set 114 (see FIG. 1) in which there was an actual SLO breach (i.e., Actual SLO Breach=Y) and for which an SLO breach is not predicted by the statistical model 118 (see FIG. 1) (i.e., Predicted SLO Breach=N).
4. For records in validation data set 114 (see FIG. 1) in which there was an actual SLO breach (i.e., Actual SLO Breach=Y) and for which an SLO breach is predicted by the statistical model 118 (see FIG. 1) (i.e., Predicted SLO Breach=Y).

TABLE 2

|  | Predicted SLO Breach = N | Predicted SLO Breach = Y |
| --- | --- | --- |
| Actual SLO Breach = N | 1,000 (78.86%) | 301 (23.14%) |
| Actual SLO Breach = Y | 21 (6.75%) | 290 (93.25%) |

For example, the result of 290 in Table 2 indicates that there are 290 records in validation data set 114 (see FIG. 1) in which there is an indication of an actual SLO breach and for which an SLO breach is predicted by the statistical model 118 (see FIG. 1). Furthermore, the (93.25%) result in Table 2 indicates that the statistical model 118 (see FIG. 1) correctly predicts a breach of the SLO for 93.25% of the records in validation data set 114 (see FIG. 1) that indicate an actual breach of the SLO. That is, there are 21+290 or 311 records that indicate an actual breach of the SLO (see the second row of data in Table 2 labeled Actual SLO Breach=Y), and 290/311=93.25%.

In one embodiment, step 210 (see FIG. 2A) includes validation module 120 (see FIG. 1) validating statistical model 118 (see FIG. 1) by calculating a percentage indicating the ratio of the number of records in the validation data set 114 (see FIG. 1) for which a breach of the SLO is correctly predicted by statistical model 118 (see FIG. 1) to the number of records in the validation data set 114 (see FIG. 1) that indicate an actual breach of the SLO (i.e., calculating a result analogous to the 93.25% percentage result in Table 2). After calculating the aforementioned percentage, the validation module 120 (see FIG. 1) compares the calculated percentage to a pre-defined threshold (e.g., 68%), and if the calculated percentage exceeds the pre-defined threshold, determines that statistical model 118 (see FIG. 1) is validated as validated statistical model 122 (see FIG. 1).

As one example, 68% is the threshold level for the ratio of the number of records in the validation data set 114 (see FIG. 1) for which a breach of the SLO is correctly predicted by statistical model 118 (see FIG. 1) to the number of records in the validation data set that indicate an actual breach of the SLO. In the example of this paragraph, step 210 (see FIG. 2A) includes calculating the 93.25% result in Table 2, comparing the 93.25% result in Table 2 to 68%, determining that 93.25%>68%, and based on 93.25% exceeding the threshold of 68%, determining that statistical model 118 (see FIG. 1) is validated.

Furthermore, again using the example illustrated by Table 1 and Table 2, the predicted result for an unknown set of data (i.e., validation data set 114 in FIG. 1) being better than the predicted result for a known set of data (i.e., training data set 112 in FIG. 1) (i.e., the 93.25% result in Table 2>the 91.99% result in Table 1) is a further indication that the statistical model 118 (see FIG. 1) is validated.

In one embodiment, step 202 through step 212 are periodically repeated to generate, validate and deploy an updated statistical model 122 (see FIG. 1) (e.g., repeated every two or three months) based on additional historical data being captured over time and being added to training data set 112 (see FIG. 1). As data is added to training data set 112 (see FIG. 1), additional incident concepts are generated, thereby making the updated statistical model 122 (see FIG. 1) more robust with an improved capability for predicting whether or not an incident specified in a work request will be resolved in accordance with a service level target. The updating of the statistical model 122 (see FIG. 1) allows the updated statistical model to determine whether an incoming incident is high risk or low risk based on a dynamically changing IT infrastructure. For example, workload in an IT infrastructure changes over time and servers and storage elements are moved into and out of the environment, which leads to descriptions of new kinds of incidents. New incident concepts are generated from text mining the descriptions of the new kinds of incidents. Based on the new incident concepts, step 206 (see FIG. 2A) generates new predictive variables and step 208 (see FIG. 2A) generates an updated statistical model 118 (see FIG. 1).

The statistical model 122 (see FIG. 1) generated in one iteration of the process of FIGS. 2A-2B is created for a particular customer based on the customer's culture and the terminology the customer uses in the descriptions of incidents, and therefore cannot necessarily be used for another customer. In one embodiment, the process of FIGS. 2A-2B is repeated, so that the process is performed for each customer of multiple customers providing incidents to computer system 102 (see FIG. 1). The repeating of the process of FIGS. 2A-2B generates, validates and deploys multiple statistical models, where each statistical model includes rules based on the culture of a respective customer and the terminology used by the respective customer in descriptions of incidents.

In one embodiment, a rule analysis module (not shown) in computer system 102 (see FIG. 1) identifies logic in the set of rules included in the validated statistical model 122 that is used most often to identify incidents that are high risk (i.e., likely to be resolved out of criteria). Based on the identified logic, computer system 102 (see FIG. 1) determines whether preventative action can be taken to reduce the number of incoming incident tickets.

Example

Figure 3:
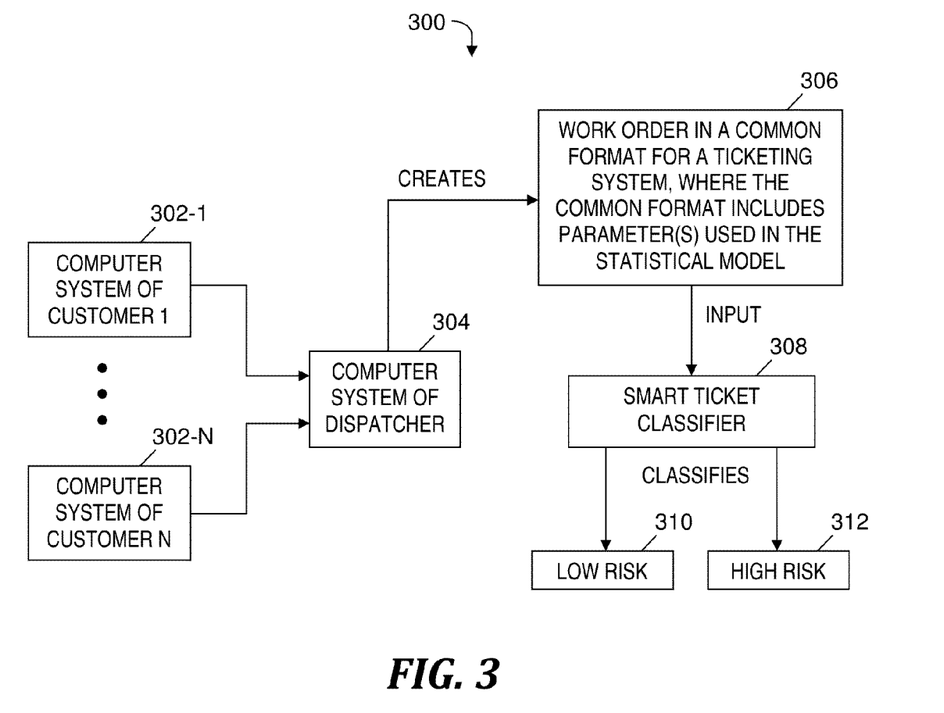
FIG. 3 is a block diagram of an exemplary ticketing system that implements the process of FIGS. 2A-2B, in accordance with embodiments of the present invention.

FIG. 3 is a block diagram of an exemplary ticketing system that implements the process of FIGS. 2A-2B, in accordance with embodiments of the present invention. Incident ticketing system 300 includes N computer systems 302-1 . . . 302-N used by customers 1 . . . N, respectively. Incident tickets created by customers and/or automated monitors are received by a computer system 304 used by a dispatcher. The incident tickets may be created in different formats by different problem management systems utilized by customers 1 . . . N. For each incident ticket, the dispatcher creates a work order 306 in a common format for ticketing system 300, where the common format includes one or more parameters used in statistical model 122 (see FIG. 1). In one embodiment, the common format includes one or more parameters that are not included in the formats of the different problem management systems utilized by customers 1 . . . N. For example, the work type associated with an incident may not be included in any of the formats of the different problem management systems utilized by customers 1 . . . N, but the dispatcher may include a work type in the work order 306.

The work order 306 having the common format is processed by a software-based smart ticket classifier 308 to filter key concepts out of the content of the work order (e.g., identifies keywords included in a description of the incident). The filtered out concepts, along with other key data elements (e.g., customer, classification ID, arrival date and time, severity, complexity and target completion date and time), are processed through statistical model 122 (see FIG. 1) to categorize the incident ticket as either low risk 310 or high risk 312. Categorizing an incident ticket as high risk 312 indicates the incident is likely to be resolved out of criteria. Categorizing an incident ticket as low risk 310 indicates the incident is likely to be resolved within criteria. Incidents categorized as high risk 312 are reported in notifications sent to the computer system 304 utilized by the dispatcher, so that the dispatcher may take corrective action to resolve the incident within criteria instead of out of criteria.

Computer System

Figure 4:
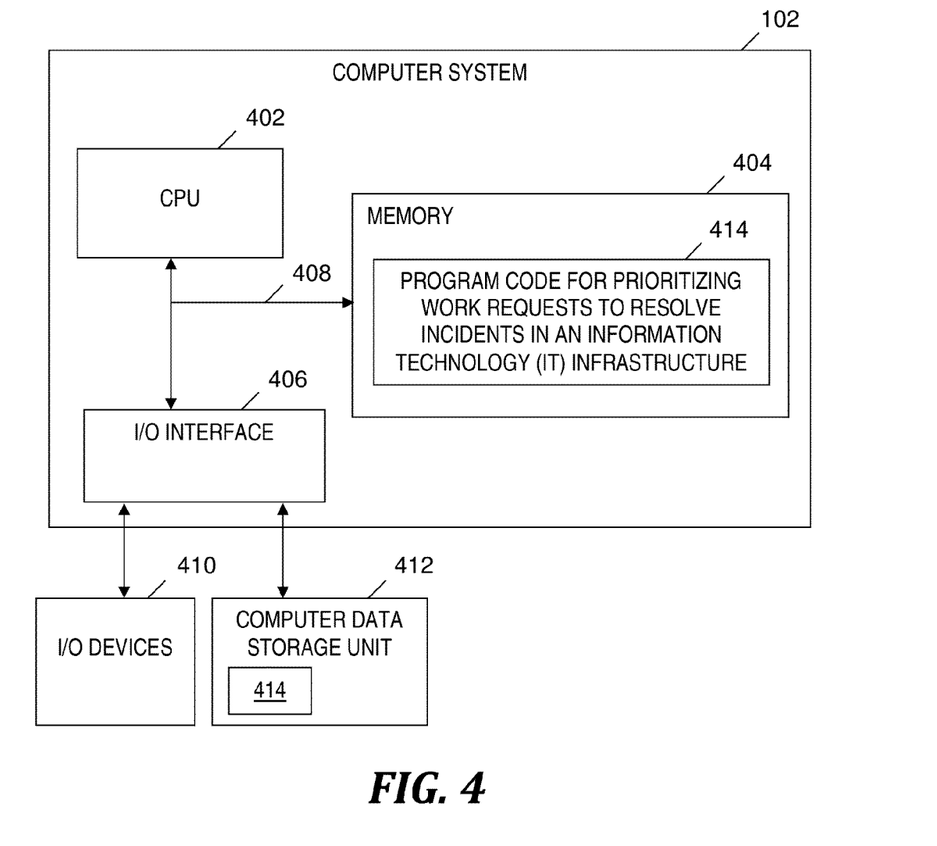
FIG. 4 is a block diagram of a computer system that is included in the system of FIG. 1 and that implements the process of FIGS. 2A-2B, in accordance with embodiments of the present invention.

FIG. 4 is a block diagram of a computer system that is included in the system of FIG. 1 and that implements the process of FIGS. 2A-2B, in accordance with embodiments of the present invention. Computer system 102 generally comprises a central processing unit (CPU) 402, a memory 404, an input/output (I/O) interface 406, and a bus 408. Further, computer system 102 is coupled to I/O devices 410 and a computer data storage unit 412. CPU 402 performs computation and control functions of computer system 102, including carrying out instructions included in program code 414 to perform a method of prioritizing work requests to resolve incidents in an IT infrastructure, where the instructions are carried out by CPU 402 via memory 404. CPU 402 may comprise a single processing unit, or be distributed across one or more processing units in one or more locations (e.g., on a client and server). In one embodiment, program code 414 includes code for work request prioritization tool 104 in FIG. 1.

Memory 404 may comprise any known computer-readable storage medium, which is described below. In one embodiment, cache memory elements of memory 404 provide temporary storage of at least some program code (e.g., program code 414) in order to reduce the number of times code must be retrieved from bulk storage while instructions of the program code are carried out. Moreover, similar to CPU 402, memory 404 may reside at a single physical location, comprising one or more types of data storage, or be distributed across a plurality of physical systems in various forms. Further, memory 404 can include data distributed across, for example, a local area network (LAN) or a wide area network (WAN).

I/O interface 406 comprises any system for exchanging information to or from an external source. I/O devices 410 comprise any known type of external device, including a display device (e.g., monitor), keyboard, mouse, printer, speakers, handheld device, facsimile, etc. Bus 408 provides a communication link between each of the components in computer system 102, and may comprise any type of transmission link, including electrical, optical, wireless, etc.

I/O interface 406 also allows computer system 102 to store information (e.g., data or program instructions such as program code 414) on and retrieve the information from computer data storage unit 412 or another computer data storage unit (not shown). Computer data storage unit 412 may comprise any known computer-readable storage medium, which is described below. For example, computer data storage unit 412 may be a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are carried out by CPU 402 via memory 404 to prioritize work requests to resolve incidents in an IT infrastructure. Although FIG. 4 depicts memory 404 as including program code 414, the present invention contemplates embodiments in which memory 404 does not include all of code 414 simultaneously, but instead at one time includes only a portion of code 414.

Further, memory 404 may include other systems not shown in FIG. 4, such as an operating system (e.g., Linux®) that runs on CPU 402 and provides control of various components within and/or connected to computer system 102. Linux is a registered trademark of Linus Torvalds in the United States, other countries, or both.

Storage unit 412 and/or one or more other computer data storage units (not shown) that are coupled to computer system 102 may store historical data 110 (see FIG. 1), training data set 112 (see FIG. 1) and/or validation data set 114 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 404 and/or computer data storage unit 412) having computer-readable program code (e.g., program code 414) embodied or stored thereon.

Any combination of one or more computer-readable mediums (e.g., memory 404 and computer data storage unit 412) may be utilized. The computer readable medium may be a computer-readable signal medium or a computer-readable storage medium. In one embodiment, the computer-readable storage medium is a computer-readable storage device or computer-readable storage apparatus. A computer-readable storage medium is an electronic, magnetic, optical, or semiconductor system, apparatus, or device. A list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-readable storage medium is a tangible medium that can contain or store a program (e.g., program 414) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 414) embodied on a computer-readable medium may be transmitted using any appropriate medium, including but not limited to wireless, wireline, optical fiber cable, RF, etc., or any suitable combination of the foregoing.

Computer program code (e.g., program code 414) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks and logos are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 4. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B) and/or block diagrams of methods, apparatus (systems) (e.g., FIG. 1 and FIG. 4), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 414). These computer program instructions may be provided to one or more hardware processors (e.g., CPU 402) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 404 or computer data storage unit 412) that can direct a computer (e.g., computer system 102), other programmable data processing apparatus, or other devices to function in a particular manner, such that the instructions (e.g., program 414) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 414) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to prioritizing work requests to resolve incidents in an IT infrastructure. Thus, an embodiment of the present invention discloses a process for supporting computer infrastructure, wherein the process comprises providing at least one support service for at least one of integrating, hosting, maintaining and deploying computer-readable code (e.g., program code 414) in a computer system (e.g., computer system 102) comprising one or more processors (e.g., CPU 402), wherein the processor(s) carry out instructions contained in the code causing the computer system to prioritize work requests to resolve incidents in an IT infrastructure.

In another embodiment, the invention provides a method that performs the process steps of the invention on a subscription, advertising and/or fee basis. That is, a service provider, such as a Solution Integrator, can offer to create, maintain, support, etc. a process of prioritizing work requests to resolve incidents in an IT infrastructure. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIGS. 2A-2B and the block diagrams in FIG. 1 and FIG. 4 illustrate the architecture, functionality, and operation of possible implementations of systems, methods, and computer program products according to various embodiments of the present invention. In this regard, each block in the flowchart or block diagrams may represent a module, segment, or portion of code (e.g., program code 414), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of prioritizing work requests to resolve incidents in an information technology (IT) infrastructure, the method comprising the steps of:
   a computer dividing, into first and second data sets, historical data, which includes historical work requests that requested resolutions of historical incidents in the IT infrastructure, each of the work requests comprising data fields;
   the computer generating, using a first set of data fields of the work requests in the first data set, one or more incident concepts;
   the computer combining the one or more incident concepts with a second set of data fields of the work requests in the first data set to form a set of predictive variables;
   based on the predictive variables, the computer generating a model which associates the historical data with a resolution of a historical incident which caused a problem in the IT infrastructure and determining the resolution of the historical incident occurred in a time period, the historical data including a first keyword included in a description of a historical work request that requested a resolution of the historical incident which caused a problem in the IT infrastructure and at least one of: (1) a first set of skills required by a person to resolve the historical incident, (2) a first customer who initiated the historical work request, (3) a first classification indicating a component of the IT infrastructure affected by the historical incident, (4) a first arrival date and time at which the historical work request was initiated by the customer, (5) a first level of severity of the historical incident based on a number of users affected by the historical incident or a potential amount of business lost as a result of the historical incident, (6) a first complexity of the historical incident, and (7) a first target completion date and time at which the historical incident was expected to be resolved;
   the computer validating the model using the second data set;
   the computer determining data elements included in a current work request that requests a resolution of a current incident affecting the IT infrastructure, the data elements including a second keyword included in a description of the current work request and at least one of: (1) a second set of skills required by a person to resolve the current incident, (2) a second customer who initiated the current work request, (3) a second classification indicating a component of the IT infrastructure affected by the current incident, (4) a second arrival date and time at which the current work request was initiated by the customer, (5) a second level of severity of the current incident based on a number of users affected by the current incident or a potential amount of business lost as a result of the current incident, and (6) a second complexity of the current incident;
   the computer determining a match between the first and second keywords, and determining at least one match included in a match between the first and second sets of skills, a match between the first and second customers, a match between the first and second classifications, a match between a day of a week specified by the first arrival date and a day of the week specified by the second arrival date, a match between the first and second levels of severity, and a match between the first and second complexities;
   based on the model, the match between the first and second keywords, and the at least one match included in the matches between the first and second sets of skills, the first and second customers, the first and second classifications, the day of the week specified by the first arrival date and the day of the week specified by the second arrival date, the first and second levels of severity, and the first and second complexities, the computer predicting a resolution of the current incident will occur within the time period, which exceeds a maximum amount of time permitted to resolve the current incident, the maximum amount of time being specified in a service level agreement with the second customer; and
   based at least in part on the current incident predicted to be resolved within the time period which exceeds the maximum amount of time permitted to resolve the current incident, the computer assigning a priority to the current work request that is higher than a priority assigned to another current work request that requests a resolution of another current incident in the IT infrastructure which, based at least in part on the model, is predicted to occur within another time period that does not exceed another maximum amount of time permitted to resolve the other current incident, the other maximum amount of time being specified in another service level agreement.

2. The method of claim 1, further comprising the step of: in response to the step of predicting the resolution of the current incident will occur within the time period which exceeds the maximum amount of time permitted to resolve the current incident, the computer notifying a user that the current work request will not be resolved in accordance with the maximum amount of time specified in the service level agreement.

3. The method of claim 1, further comprising the steps of:
the computer text mining descriptions of the historical incidents whose resolutions were requested by the historical work requests included in the historical data;
based on the text mined descriptions, the computer determining a word occurs in a first percentage of the descriptions of the historical incidents;
the computer determining the first percentage exceeds a first threshold;
based on the text mined descriptions, the computer determining the word occurs in a second percentage of a subset of the descriptions of the historical incidents, wherein the subset of the descriptions of the historical incidents consists of descriptions of one or more historical incidents that were not resolved in accordance with respective service level targets, the one or more historical incidents being included in the historical incidents whose resolutions were requested by the historical work requests;
the computer determining the second percentage exceeds a second threshold, the second threshold being different from the first threshold; and
based on the first and second percentages exceeding the first and second thresholds, respectively, the computer generating the first keyword so that the first keyword is the word.

4. The method of claim 1, further comprising the step of:
based on the priority of the current work request being higher than the priority of the other current work request, the computer receiving an assignment of a resource having a skill to the resolution of the current incident and receiving an assignment of another resource that does not have the skill to the resolution of the other current incident.

5. The method of claim 1, further comprising the step of:
the computer determining the second level of severity included in the current work request is identical to a level of severity included in the other current work request; and
wherein the step of assigning the priority to the current work request that is higher than the priority of the other current work request is performed even though the second level of severity included in the current work request is identical to a level of severity included in the other current work request.

6. The method of claim 1, wherein the step of generating the model includes associating the historical data with the resolution of the historical incident, the historical data consisting of: (1) the first keyword included in the description of the historical work request that requested the resolution of the historical incident which caused the problem in the IT infrastructure, (2) the first set of skills required by the person to resolve the historical incident, (3) the first customer who initiated the historical work request, (4) the first classification indicating the component of the IT infrastructure affected by the historical incident, (5) the first arrival date and time at which the historical work request was initiated by the customer, (6) the first level of severity of the historical incident based on the number of users affected by the historical incident or the potential amount of business lost as the result of the historical incident, (7) the first complexity of the historical incident, and (8) the first target completion date and time at which the historical incident was expected to be resolved.

7. A computer system comprising:
a central processing unit (CPU);
a memory coupled to the CPU;
a computer-readable storage device coupled to the CPU, the storage device containing instructions that, when carried out by the CPU via the memory, implement a method of prioritizing work requests to resolve incidents in an information technology (IT) infrastructure, the method comprising the steps of:
the computer system dividing, into first and second data sets, historical data, which includes historical work requests that requested resolutions of historical incidents in the IT infrastructure, each of the work requests comprising data fields;
the computer system generating, using a first set of data fields of the work requests in the first data set, one or more incident concepts;
the computer system combining the one or more incident concepts with a second set of data fields of the work requests in the first data set to form a set of predictive variables;
based on the predictive variables, the computer system generating a model which associates the historical data with a resolution of a historical incident which caused a problem in the IT infrastructure and determining the resolution of the historical incident occurred in a time period, the historical data including a first keyword included in a description of a historical work request that requested a resolution of the historical incident which caused a problem in the IT infrastructure and at least one of: (1) a first set of skills required by a person to resolve the historical incident, (2) a first customer who initiated the historical work request, (3) a first classification indicating a component of the IT infrastructure affected by the historical incident, (4) a first arrival date and time at which the historical work request was initiated by the customer, (5) a first level of severity of the historical incident based on a number of users affected by the historical incident or a potential amount of business lost as a result of the historical incident, (6) a first complexity of the historical incident, and (7) a first target completion date and time at which the historical incident was expected to be resolved;
the computer system validating the model using the second data set;
the computer system determining data elements included in a current work request that requests a resolution of a current incident affecting the IT infrastructure, the data elements including a second keyword included in a description of the current work request and at least one of: (1) a second set of skills required by a person to resolve the current incident, (2) a second customer who initiated the current work request, (3) a second classification indicating a component of the IT infrastructure affected by the current incident, (4) a second arrival date and time at which the current work request was initiated by the customer, (5) a second level of severity of the current incident based on a number of users affected by the current incident or a potential amount of business lost as a result of the current incident, and (6) a second complexity of the current incident;

the computer system determining a match between the first and second keywords, and determining at least one match included in a match between the first and second sets of skills, a match between the first and second customers, a match between the first and second classifications, a match between a day of a week specified by the first arrival date and a day of the week specified by the second arrival date, a match between the first and second levels of severity, and a match between the first and second complexities;

based on the model, the match between the first and second keywords, and the at least one match included in the matches between the first and second sets of skills, the first and second customers, the first and second classifications, the day of the week specified by the first arrival date and the day of the week specified by the second arrival date, the first and second levels of severity, and the first and second complexities, the computer system predicting a resolution of the current incident will occur within the time period, which exceeds a maximum amount of time permitted to resolve the current incident, the maximum amount of time being specified in a service level agreement with the second customer; and based at least in part on the current incident predicted to be resolved within the time period which exceeds the maximum amount of time permitted to resolve the current incident, the computer system assigning a priority to the current work request that is higher than a priority assigned to another current work request that requests a resolution of another current incident in the IT infrastructure which, based at least in part on the model, is predicted to occur within another time period that does not exceed another maximum amount of time permitted to resolve the other current incident, the other maximum amount of time being specified in another service level agreement.

8. The computer system of claim 7, wherein the method further comprises the step of:

in response to the step of predicting the resolution of the current incident will occur within the time period which exceeds the maximum amount of time permitted to resolve the current incident, the computer system notifying a user that the current work request will not be resolved in accordance with the maximum amount of time specified in the service level agreement.

9. The computer system of claim 7, wherein the method further comprises the steps of:

the computer system text mining descriptions of the historical incidents whose resolutions were requested by the historical work requests included in the historical data;

based on the text mined descriptions, the computer system determining a word occurs in a first percentage of the descriptions of the historical incidents;

the computer system determining the first percentage exceeds a first threshold;

based on the text mined descriptions, the computer system determining the word occurs in a second percentage of a subset of the descriptions of the historical incidents, wherein the subset of the descriptions of the historical incidents consists of descriptions of one or more historical incidents that were not resolved in accordance with respective service level targets, the one or more historical incidents being included in the historical incidents whose resolutions were requested by the historical work requests;

the computer system determining the second percentage exceeds a second threshold, the second threshold being different from the first threshold; and based on the first and second percentages exceeding the first and second thresholds, respectively, the computer system generating the first keyword so that the first keyword is the word.

10. The computer system of claim 7, wherein the step of generating the model includes associating the historical data with the resolution of the historical incident, the historical data consisting of: (1) the first keyword included in the description of the historical work request that requested the resolution of the historical incident which caused the problem in the IT infrastructure, (2) the first set of skills required by the person to resolve the historical incident, (3) the first customer who initiated the historical work request, (4) the first classification indicating the component of the IT infrastructure affected by the historical incident, (5) the first arrival date and time at which the historical work request was initiated by the customer, (6) the first level of severity of the historical incident based on the number of users affected by the historical incident or the potential amount of business lost as the result of the historical incident, (7) the first complexity of the historical incident, and (8) the first target completion date and time at which the historical incident was expected to be resolved.

11. A computer program product comprising a computer-readable storage device having computer-readable program instructions stored therein, the computer-readable program instructions, when carried out by a central processing unit (CPU) of a computer system, implement a method of prioritizing work requests to resolve incidents in an information technology (IT) infrastructure, the method comprising the steps of:

the computer system dividing, into first and second data sets, historical data, which includes historical work requests that requested resolutions of historical incidents in the IT infrastructure, each of the work requests comprising data fields;

the computer system generating, using a first set of data fields of the work requests in the first data set, one or more incident concepts;

the computer system combining the one or more incident concepts with a second set of data fields of the work requests in the first data set to form a set of predictive variables;

based on the predictive variables, the computer system generating a model which associates the historical data with a resolution of a historical incident which caused a problem in the IT infrastructure and determining the resolution of the historical incident occurred in a time period, the historical data including a first keyword included in a description of a historical work request that requested a resolution of the historical incident which caused a problem in the IT infrastructure, and at least one of: (1) a first set of skills required by a person to resolve the historical incident, (2) a first customer who initiated the historical work request, (3) a first classification indicating a component of the IT infrastructure affected by the historical incident, (4) a first arrival date and time at which the historical work request was initiated by the customer, (5) a first level of severity of the historical incident based on a number of users affected by the historical incident or a potential amount of business lost as a result of the historical incident, (6) a first complexity of the historical incident, and (7) a first target completion date and time at which the historical incident was expected to be resolved;

the computer system validating the model using the second data set;

the computer system determining data elements included in a current work request that requests a resolution of a current incident affecting the IT infrastructure, the data elements including a second keyword included in a description of the current work request and at least one of: (1) a second set of skills required by a person to resolve the current incident, (2) a second customer who initiated the current work request, (3) a second classification indicating a component of the IT infrastructure affected by the current incident, (4) a second arrival date and time at which the current work request was initiated by the customer, (5) a second level of severity of the current incident based on a number of users affected by the current incident or a potential amount of business lost as a result of the current incident, and (6) a second complexity of the current incident;

the computer system determining a match between the first and second keywords, and determining at least one match included in a match between the first and second sets of skills, a match between the first and second customers, a match between the first and second classifications, a match between a day of a week specified by the first arrival date and a day of the week specified by the second arrival date, a match between the first and second levels of severity, and a match between the first and second complexities;

based on the model, the match between the first and second keywords, and the at least one match included in the matches between the first and second sets of skills, the first and second customers, the first and second classifications, the day of the week specified by the first arrival date and the day of the week specified by the second arrival date, the first and second levels of severity, and the first and second complexities, the computer system predicting a resolution of the current incident will occur within the time period, which exceeds a maximum amount of time permitted to resolve the current incident, the maximum amount of time being specified in a service level agreement with the second customer; and based at least in part on the current incident predicted to be resolved within the time period which exceeds the maximum amount of time permitted to resolve the current incident, the computer system assigning a priority to the current work request that is higher than a priority assigned to another current work request that requests a resolution of another current incident in the IT infrastructure which, based at least in part on the model, is predicted to occur within another time period that does not exceed another maximum amount of time permitted to resolve the other current incident, the other maximum amount of time being specified in another service level agreement.

12. The program product of claim 11, wherein the method further comprises the step of:

in response to the step of predicting the resolution of the current incident will occur within the time period which exceeds the maximum amount of time permitted to resolve the current incident, the computer system notifying a user that the current work request will not be resolved in accordance with the maximum amount of time specified in the service level agreement.

13. The program product of claim 11, wherein the method further comprises the steps of:

the computer system text mining descriptions of the historical incidents whose resolutions were requested by the historical work requests included in the historical data;

based on the text mined descriptions, the computer system determining a word occurs in a first percentage of the descriptions of the historical incidents;

the computer system determining the first percentage exceeds a first threshold;

based on the text mined descriptions, the computer system determining the word occurs in a second percentage of a subset of the descriptions of the historical incidents, wherein the subset of the descriptions of the historical incidents consists of descriptions of one or more historical incidents that were not resolved in accordance with respective service level targets, the one or more historical incidents being included in the historical incidents whose resolutions were requested by the historical work requests;

the computer system determining the second percentage exceeds a second threshold, the second threshold being different from the first threshold; and based on the first and second percentages exceeding the first and second thresholds, respectively, the computer system generating the first keyword so that the first keyword is the word.

14. The program product of claim 11, wherein the step of generating the model includes associating the historical data with the resolution of the historical incident, the historical data consisting of: (1) the first keyword included in the description of the historical work request that requested the resolution of the historical incident which caused the problem in the IT infrastructure, (2) the first set of skills required by the person to resolve the historical incident, (3) the first customer who initiated the historical work request, (4) the first classification indicating the component of the IT infrastructure affected by the historical incident, (5) the first arrival date and time at which the historical work request was initiated by the customer, (6) the first level of severity of the historical incident based on the number of users affected by the historical incident or the potential amount of business lost as the result of the historical incident, (7) the first complexity of the historical incident, and (8) the first target completion date and time at which the historical incident was expected to be resolved.

15. A process for supporting computing infrastructure, the process comprising a first computer system providing at least one support service for at least one of creating, integrating, hosting, maintaining, and deploying computer-readable code in a second computer system comprising a processor, the computer-readable code containing instructions, wherein the instructions, when carried out by a processor of the second computer system, implement a method of prioritizing work requests to resolve incidents in an information technology (IT) infrastructure, the method comprising the steps of:

the second computer system dividing, into first and second data sets, historical data, which includes historical work requests that requested resolutions of historical incidents in the IT infrastructure, each of the work requests comprising data fields;

the second computer system generating, using a first set of data fields of the work requests in the first data set, one or more incident concepts;

the second computer system combining the one or more incident concepts with a second set of data fields of the work requests in the first data set to form a set of predictive variables;

based on the predictive variables, the second computer system generating a model which associates the historical data with a resolution of a historical incident which caused a problem in the IT infrastructure and determining the resolution of the historical incident occurred in a time period, the historical data including a first keyword included in a description of a historical work request that requested a resolution of the historical incident which caused a problem in the IT infrastructure, and at least one of: (1) a first set of skills required by a person to resolve the historical incident, (2) a first customer who initiated the historical work request, (3) a first classification indicating a component of the IT infrastructure affected by the historical incident, (4) a first arrival date and time at which the historical work request was initiated by the customer, (5) a first level of severity of the historical incident based on a number of users affected by the historical incident or a potential amount of business lost as a result of the historical incident, (6) a first complexity of the historical incident, and (7) a first target completion date and time at which the historical incident was expected to be resolved;

the second computer system validating the model using the second data set;

the second computer system determining data elements included in a current work request that requests a resolution of a current incident affecting the IT infrastructure, the data elements including a second keyword included in a description of the current work request and at least one of: (1) a second set of skills required by a person to resolve the current incident, (2) a second customer who initiated the current work request, (3) a second classification indicating a component of the IT infrastructure affected by the current incident, (4) a second arrival date and time at which the current work request was initiated by the customer, (5) a second level of severity of the current incident based on a number of users affected by the current incident or a potential amount of business lost as a result of the current incident, and (6) a second complexity of the current incident;

the second computer system determining a match between the first and second keywords, and determining at least one match included in a match between the first and second sets of skills, a match between the first and second customers, a match between the first and second classifications, a match between a day of a week specified by the first arrival date and a day of the week specified by the second arrival date, a match between the first and second levels of severity, a match between and the first and second complexities;

based on the model, the match between the first and second keywords, at the at least one match included in the matches between the first and second sets of skills, the first and second customers, the first and second classifications, the day of the week specified by the first arrival date and the day of the week specified by the second arrival date, the first and second levels of severity, and the first and second complexities, the second computer system predicting a resolution of the current incident will occur within the time period, which exceeds a maximum amount of time permitted to resolve the current incident, the maximum amount of time being specified in a service level agreement with the second customer; and based at least in part on the current incident predicted to be resolved within the time period which exceeds the maximum amount of time permitted to resolve the current incident, the second computer system assigning a priority to the current work request that is higher than a priority assigned to another current work request that requests a resolution of another current incident in the IT infrastructure which, based at least in part on the model, is predicted to occur within another time period that does not exceed another maximum amount of time permitted to resolve the other current incident, the other maximum amount of time being specified in another service level agreement.

16. The process of claim 15, wherein the method further comprises the step of:

in response to the step of predicting the resolution of the current incident will occur within the time period which exceeds the maximum amount of time permitted to resolve the current incident, the second computer system notifying a user that the current work request will not be resolved in accordance with the maximum amount of time specified in the service level agreement.

17. The process of claim 15, wherein the method further comprises the steps of:

the second computer system text mining descriptions of the historical incidents whose resolutions were requested by the historical work requests included in the historical data;

based on the text mined descriptions, the second computer system determining a word occurs in a first percentage of the descriptions of the historical incidents;

the second computer system determining the first percentage exceeds a first threshold;

based on the text mined descriptions, the second computer system determining the word occurs in a second percentage of a subset of the descriptions of the historical incidents, wherein the subset of the descriptions of the historical incidents consists of descriptions of one or more historical incidents that were not resolved in accordance with respective service level targets, the one or more historical incidents being included in the historical incidents whose resolutions were requested by the historical work requests;

the second computer system determining the second percentage exceeds a second threshold, the second threshold being different from the first threshold; and based on the first and second percentages exceeding the first and second thresholds, respectively, the second computer system generating the first keyword so that the first keyword is the word.

18. The process of claim 15, wherein the step of generating the model includes associating the historical data with the resolution of the historical incident, the historical data consisting of: (1) the first keyword included in the description of the historical work request that requested the resolution of the historical incident which caused the problem in the IT infrastructure, (2) the first set of skills required by the person to resolve the historical incident, (3) the first customer who initiated the historical work request, (4) the first classification indicating the component of the IT infrastructure affected by the historical incident, (5) the first arrival date and time at which the historical work request was initiated by the customer, (6) the first level of severity of the historical incident based on the number of users affected by the historical incident or the potential amount of business lost as the result of the historical incident, (7) the first complexity of the historical incident, and (8) the first target completion date and time at which the historical incident was expected to be resolved.

* * * * *